United States Patent [19]

Hornagold

[11] 4,148,531

[45] Apr. 10, 1979

[54] SELF-ALIGNING SLIDE PADS FOR TELESCOPIC BOOM

[75] Inventor: John T. Hornagold, Waukesha, Wis.

[73] Assignee: American Hoist & Derrick Company, St. Paul, Minn.

[21] Appl. No.: 815,703

[22] Filed: Aug. 15, 1977

[51] Int. Cl.$^2$ ........................ F16C 17/00; B66C 23/00

[52] U.S. Cl. ........................................ 308/3 R; 212/55

[58] Field of Search .................. 308/3 R; 212/55, 144

[56] References Cited

U.S. PATENT DOCUMENTS

| | | | |
|---|---|---|---|
| 3,620,579 | 11/1971 | Brown et al. | 308/3 R |
| 3,669,280 | 6/1972 | Garrett et al. | 308/3 R |
| 3,690,742 | 9/1972 | Sung | 308/3 R |
| 3,719,403 | 3/1973 | Sung | 308/3 R |
| 3,972,571 | 8/1976 | Benkowski | 308/3 R |

*Primary Examiner*—Charles E. Frankfort
*Attorney, Agent, or Firm*—Burd, Braddock & Bartz

[57] ABSTRACT

A telescopic boom consists of a plurality of generally rectangular boom sections nested with each outwardly extending section inside of the next adjacent inward section. The boom is provided with self-aligning slide pad mounts at both the front and rear reaction points. At the front reaction point, this mounting includes elongated slide pads supported to stay with the outside inward boom section and situated directly under the side plates of the outwardly extending inside boom section. At the rear reaction points, the mounting includes elongated slide pads mounted to move with, and to be immediately adjacent to, outer surfaces of the side plates of the outwardly extending, inside boom section. Both the front reaction slide pads and the rear reaction slide pads are mounted to pivot on a horizontal axis with respect to the boom section with which they move, and the pivotal mountings for these slide pads are situated between the adjacent, spaced apart side plates of the nested boom sections. Adjustable shimmed slide pads are provided at the top and bottom sides of the boom sections adjacent each front reaction point to provide side support when the boom is subjected to side loads. The rear reaction slide pads provide similar support at the rear reaction points.

16 Claims, 8 Drawing Figures

SELF-ALIGNING SLIDE PADS FOR TELESCOPIC BOOM

BACKGROUND OF THE INVENTION

This invention has relation to telescopic crane booms consisting of a plurality of nested boom sections. The outwardly extending section of each pair of mutually telescopic sections is situated inside of the inward section and, typically, today, supported to slide with respect to the inward, outside section under load at a front reaction point on the inward, outside section, and at a rear reaction point between the rear of the outwardly extending inside section and the inward, outside section. This invention has relation to an advantageous structure mounting slide pads at these front and rear reaction points and for mounting side slide pads to resist any turning moments between adjacent sections.

In the prior art structures as typified, for example, by U.S. Pat. No. 3,837,502 to John T. Hornagold, granted Sept. 24, 1974, slide pads have been short in longitudinal direction of the boom sections, and have so caused poor load distribution in the side plates of those boom sections. The short side plates have resulted in excessively high loadings of the side plates as the boom sections are moved relative to each other under load.

Further, the positioning of the slide pads has caused high bending loads in the cap plates and premature buckling failure in the bottom plates of the boom sections.

The ultimate strength of a boom in its fully extended condition is limited by the amount of overlap between the front reaction point and the rear reaction point. When the slide pads are elongated longitudinally of the boom, in order to get better load distribution into the side plates, the effective front and rear reaction points are moved toward each other, and the effective working length of the boom sections in thus reduced.

When under load, and even, to a certain extent, when only carrying their own weight, as the boom sections are extended with respect to each other, each section, and consequently the entire boom, deflect significantly in downward direction. This makes it imperative for the slide pads moving with one end of one boom section to be mounted in such a manner that they can pivot with respect to the adjacent boom section over which they are sliding in order that the load can be distributed through the slide pads uniformly. Before the present invention, the construction of such pivotal mountings for slide plates was of a nature to shorten the effective length of each boom section, in many cases.

BRIEF SUMMARY OF THE INVENTION

A telescopic boom consists of a plurality of mutually slidable, nested boom sections. In the present disclosure, an outwardly extending point section and a base section pivotally mounted to a crane carrier body are shown. However, one or more intermediate sections can be supported between the base section and the point section in accordance with the teachings of the invention. As shown, each of the boom sections is fabricated of parallel spaced apart side plates, an integral welded cap plate connecting the side plates, and an integral welded bottom plate connecting the side plates. The invention applies equally well, however, to lattice type booms.

As the point section of the boom moves inwardly and outwardly with respect to the base section thereof under load, for example, the point section bottom plate slides on front reaction slide pads mounted adjacent the leading edge portion of the base section of the boom; while the underside of the cap plate of the boom base section is contacted by slide pads mounted with respect to a trailing edge portion of the boom point section.

The front reaction slide pads are supported on a U-shaped front slide pad support carrier which is pivotally mounted with respect to the side plates of the boom base section to be in sliding supporting load bearing relationship with respect to the boom base bottom plate and in vertical alignment just below the boom base section side plates.

The rear reaction slide pads are mounted in saddles which are pivotally mounted with respect to the boom point section side plates in position between those side plates and the base section side plates and in bearing, sliding, load transmitting relationship to the underside of the boom base section cap plate. The thickness of the rear reaction slide pads is such that they come into sliding relationship with respect to the base section and point section side plates to resist side loads on the boom.

Adjustable shimmed slide pads are provided at the top and bottom sides of the boom base section adjacent the front reaction point also to provide side support when the boom is subjected to side loads.

By utilizing the space between adjacent side plates and bottom plates to provide means for pivotally mounting the slide pads with respect to their side plates, it is possible to provide for substantially greatly elongated slide pads without substantially shortening the effective minimum overlap between load reaction point without increasing the retracted length of the boom. This is so because, in the case of more than two nested boom sections in a boom, when the boom is retracted, the front reaction slide pads slide into vertical overlying relationship with respect to each other, and the rear reaction slide pads slide into adjacent overlapping nesting relationship with respect to each other.

The slide pads are replaceable when worn, and are so positioned that they compensate automatically for slide pad wear until such time as they are worn to the point of needing to be replaced. They are also positioned to compensate automatically for boom deflection under load, and also for misalignment between the parts due to manufacturing tolerances.

Because the slide pads are positioned directly in vertical alignment under the side plates (front reaction point) and are positioned immediately adjacent to the side plates with respect to which they slide (rear reaction point) and because the mounting structure is such that they can be substantially longer than was practical before the present invention, the load distribution at these reaction points and into the adjacent side plates is much more uniform than heretofore.

IN THE DRAWINGS

Figure 2:
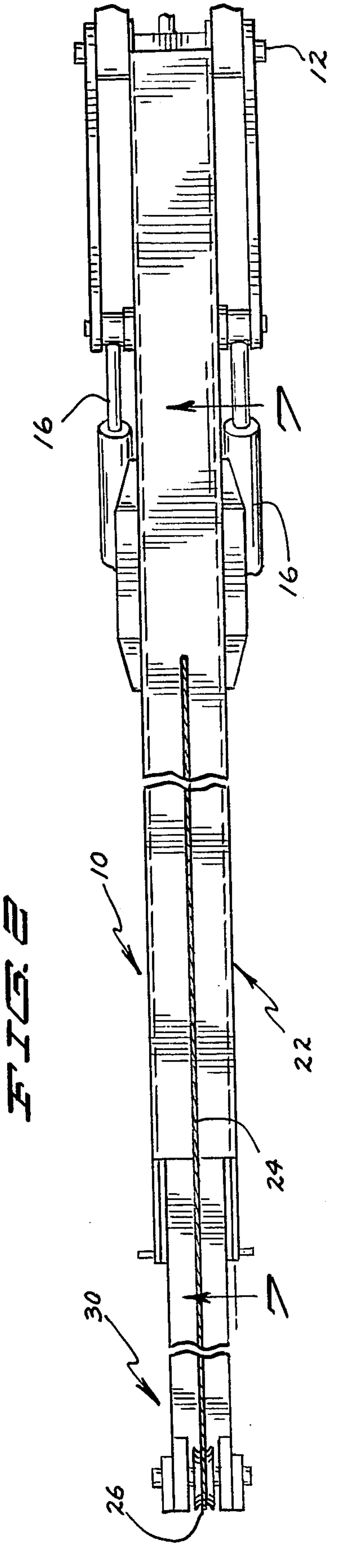
FIG. 2 is a top plan view of the boom shown in FIG. 1.
Figure 3:
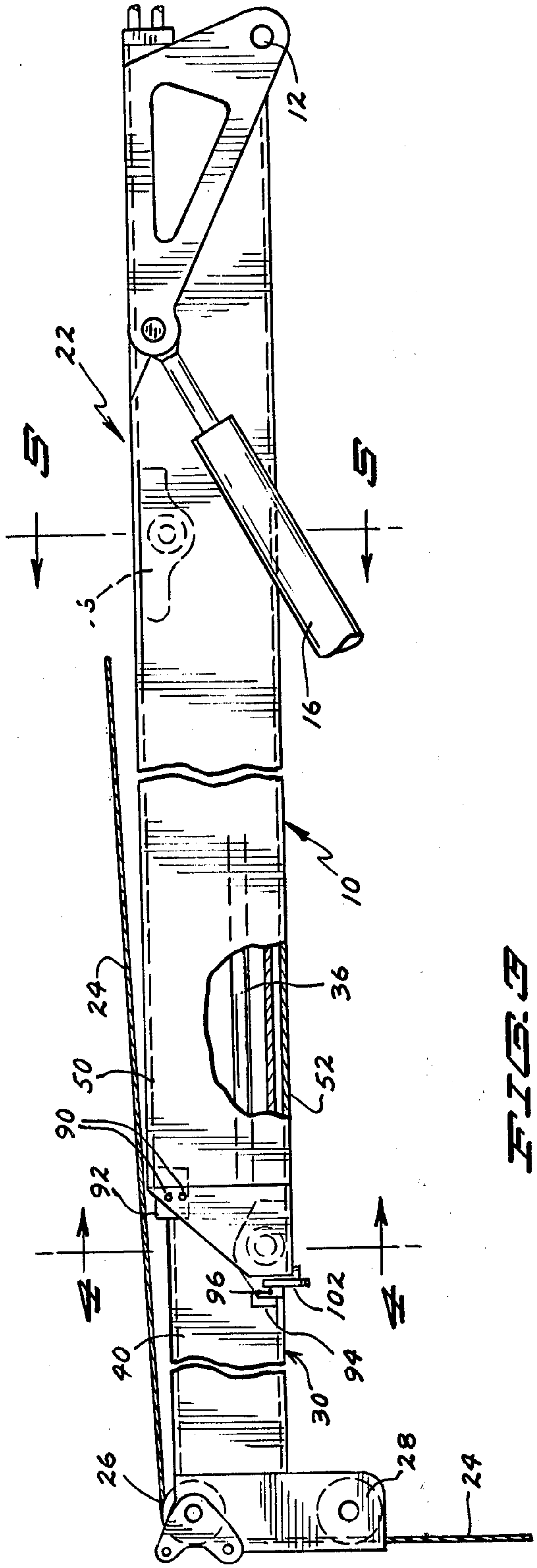
FIG. 3 is a side elevational view of the boom of FIGS. 1 and 2.
Figure 4:
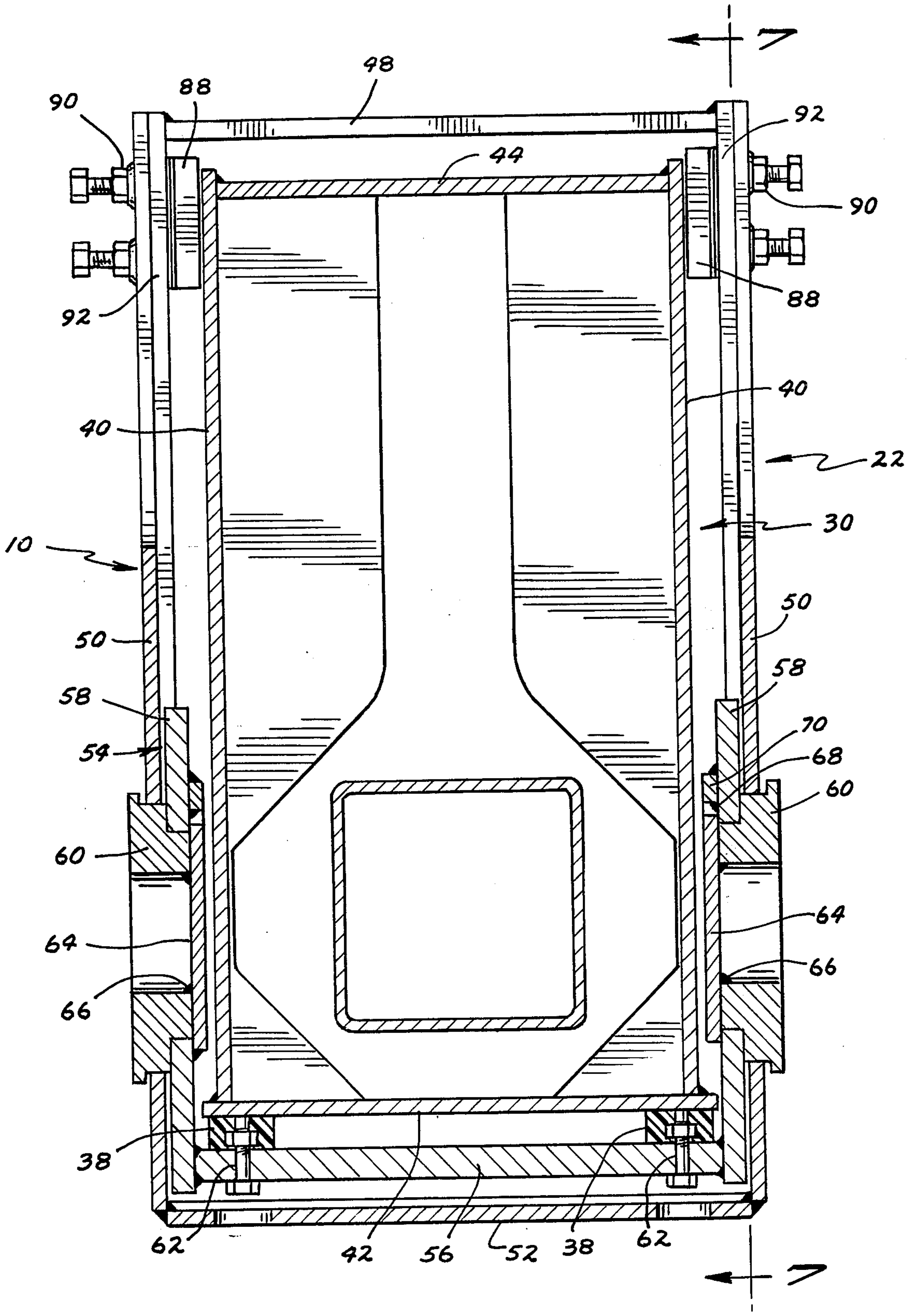
FIG. 4 is an enlarged cross sectional view of the boom of FIGS. 1, 2 and 3 as taken on the line 4—4 in FIG. 3.
Figure 5:
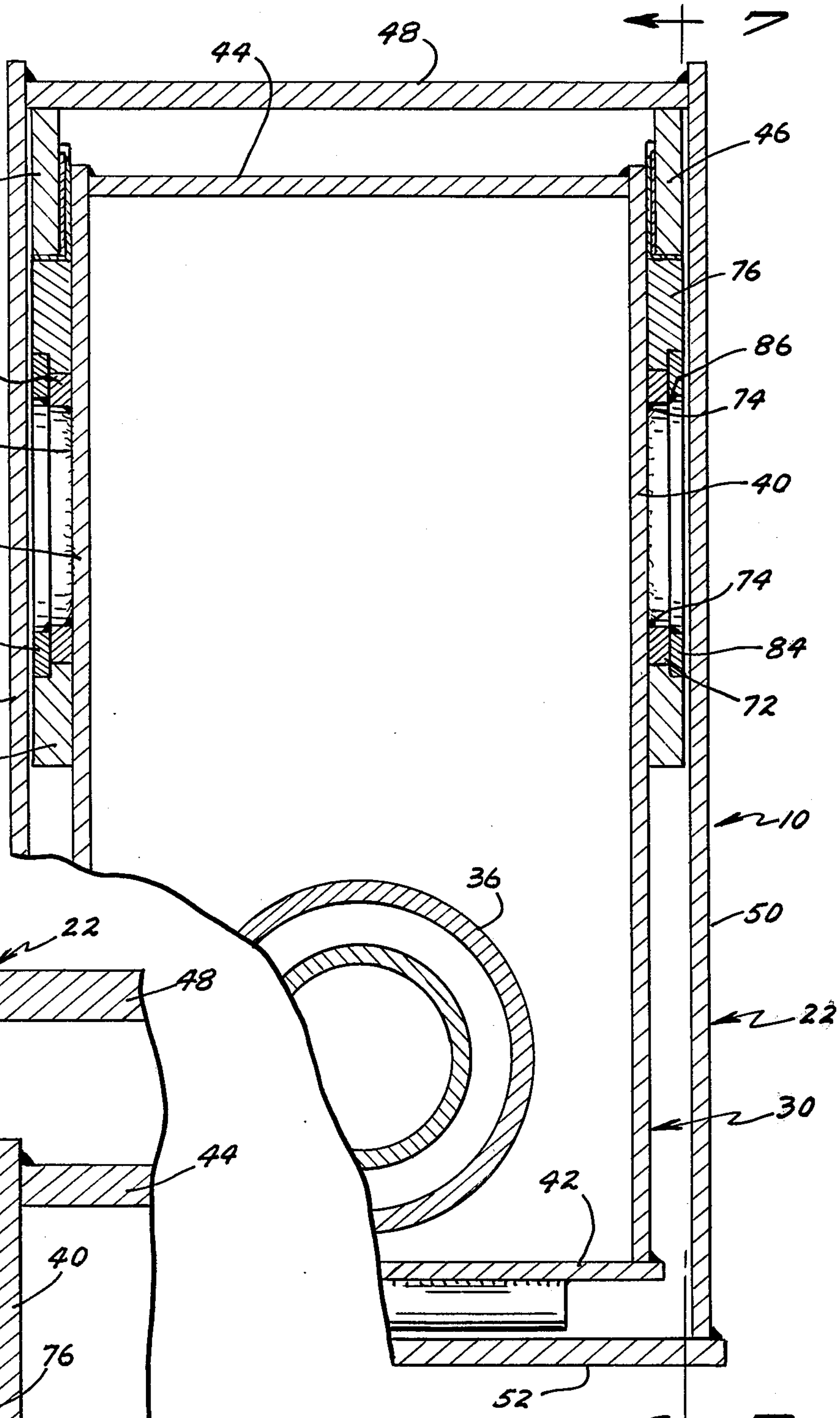
FIG. 5 is a fragmentary enlarged cross sectional view taken on the line 5—5 in FIG. 3.
Figure 7:
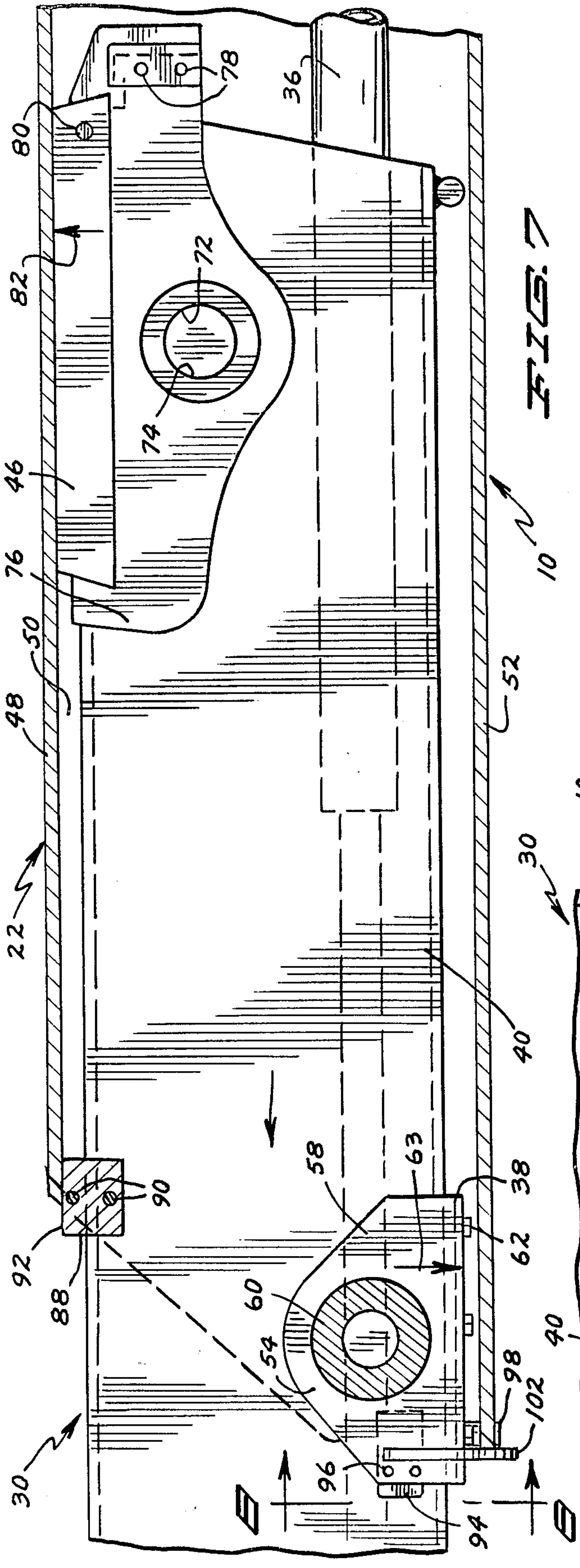
Figure 8:
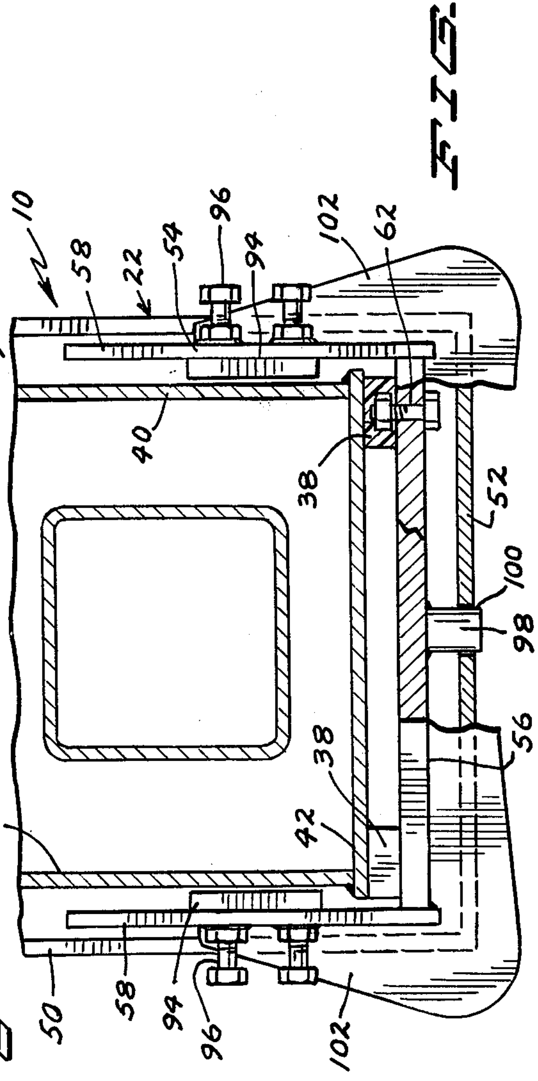

FIG. 7 is an enlarged vertical cross sectional view taken on the line 7—7 in FIGS. 2, 4 and 5; and FIG. 8 is an enlarged fragmentary horizontal sectional view taken on the line 8—8 in FIG. 7.

DESCRIPTION OF PREFERRED EMBODIMENT

A telescopic boom 10 is pivotally mounted as at 12 to a suitable crane carrier vehicle 14. The angular relationship of the boom 10 to the vehicle and to the ground on which the vehicle is supported is controlled by a linear hydraulic motor 16 acting between the vehicle and the boom.

As shown, a power operated winch 18 is mounted by bracket 20 on the outside top surface of a boom base section 22, and a load line 24 extends from the winch 18 up the boom and over sheaves 26 and 28 each rotatably mounted with respect to the point of a boom point section 30, from where it descends to a load handling hook 32 which is fastened to a work load 34.

The boom sections are telescoped with respect to each other through the instrumentality of a linear hydraulic boom extension motor 36 anchored at one end to boom point section 30 and at the other end to boom base section 22.

Figure 6:
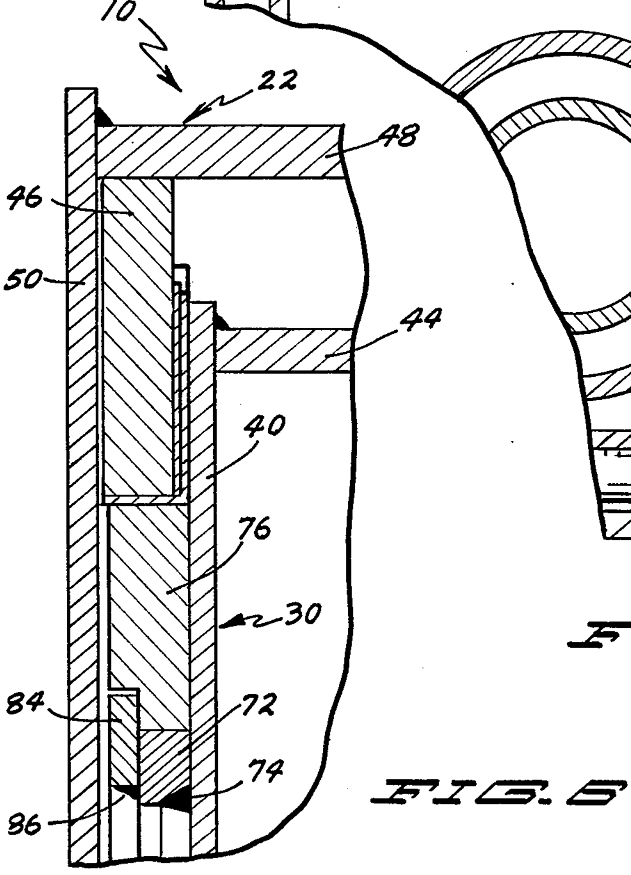
FIG. 6 is a further enlarged fragmentary sectional view of the boom taken on the line 5—5, and as seen in the upper lefthand corner of FIG. 5.

As perhaps best seen in FIG. 7, a pair of front reaction point slide pads 38,38 stay with the boom outside or base section 22, and as perhaps best seen in FIG. 8, slide on a point section bottom plate 42 in direct vertical alignment under a pair of boom point section side plates 40,40, which are integrally welded to the bottom plate 42. A boom point section cap plate 44 is also integrally welded to the point section side plates 40,40, all as seen in FIGS. 5 and 6, for example.

Also as best seen in FIG. 7, a pair of rear reaction point slide pads 46,46 move with the boom inside or point section 30 and slide on the undersurface of a boom base section cap plate 48 which is integrally welded to boom base section side plates 50,50, which, in turn, are integrally welded to boom base section bottom plate 52. See FIG. 4, for example.

Figure 1:
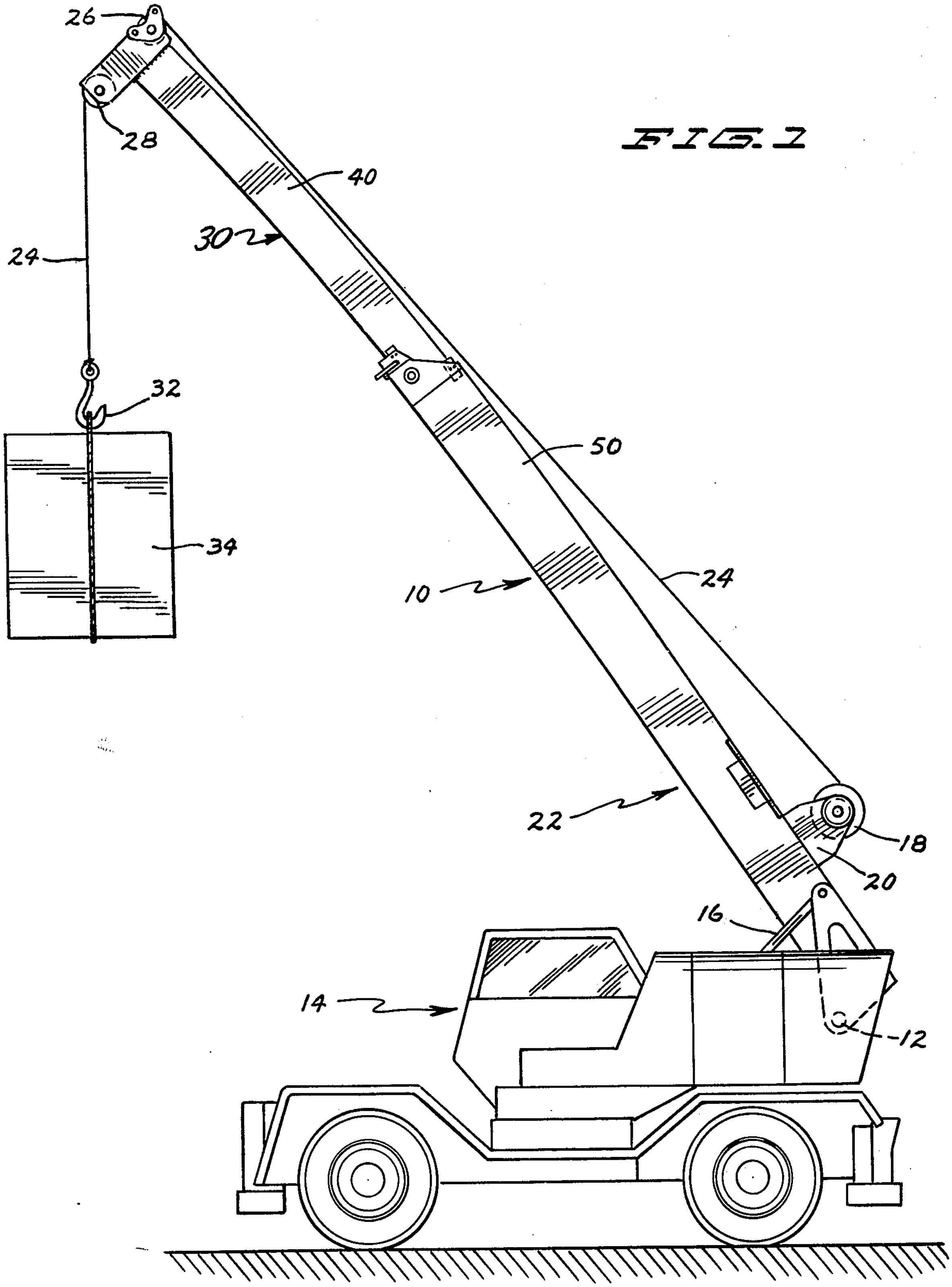
FIG. 1 is a side elevational view of a telescopic boom utilizing the self-aligning slide pads of the invention, the boom being shown in association with a vehicle on which it can be employed, and illustrating the deflection of the boom under load.

As suggested in FIG. 1, the actual deflection of the boom base section 22 and of the boom point section 30 when the boom 10 is under load is appreciable, and in order for the front reaction slide pads 38,38 and the rear reaction slide pads 46,46 to make intimate and even load bearing contact with the bottom surface of the point section bottom plate 42 and the base section cap plate 48, respectively, over the entire length of the slide pads, pivotal mountings for each of the slide pads with respect to the boom section with which it moves have been provided.

The front reaction slide pads 38,38 are removably fastened to a U-shape front slide pad carrier 54 including a front slide pad carrier floor 56 integrally welded to a pair of upstanding front slide pad carrier walls 58,58. These walls 58,58 are each provided with a circular opening to be pivotally supported with respect to a boss 60 which is integral with and extends inwardly from each of the boom base section side plates 50,50.

The arrow 63 in FIG. 7 indicates that the boom point section bottom plate 42 in contact with the front reaction slide pads 38,38 is being forced down against those slide pads by the weight of the point section and the load suspended from it.

As seen in FIGS. 4 and 7, each of the front reaction slide pads 38,38 is provided with a plurality of openings therethrough in alignment with openings in the front slide pad carrier floor 56 so that nut and bolt assemblies 62 or other fastening means can be utilized to removably fixedly position the slide pads 38 with respect to the front slide pad carrier 54. Thus as the angular relationship of the boom point section bottom plate 42 changes with respect to the longitudinal axis of the boom base section under various degrees of loading, the upright front slide pad carrier walls 58,58 of the front slide pad carrier 54 are free to rotate with respect to the boom base section side plates 50,50 about the axis of bosses 60,60, to the end that front reaction slide pads 38,38 maintain an even bearing relationship and contact with the underside of boom point section bottom plate 42 over the entire length of the slide pads. This provides a front reaction support point directly underneath each of the boom point section side plates 40,40 over a considerable length, and this distributes the transmitted forces evenly into those side plates and to the remainder of the boom point section.

This same structure allows the front reaction slide pads to maintain integral bearing relationship with respect to the boom point section in spite of any imperfections in manufacturing tolerances between the shapes of the contacting portions of the boom and the slide pads.

It is important that there be freedom of rotation between each of the upright front slide pad carrier walls 58,58 and the boom base section side plates 50,50 about the axis of the bosses 60,60 once the carrier walls 58,58 are installed over the bosses 60,60. A boss cap plate 64 is welded to each boss 60 as at 66 to "trap" each carrier plate 58 and keep it in position on its boss. This cap plate 64 is provided with an elongated slot 68, and each slide pad carrier wall 58 has an alignment block 70 extending inwardly therefrom to be positioned in this slot 68 to limit maximum pivotal movement of the carrier 54 with respect to its boom base section side plate 50.

As to the rear reaction slide pads 46,46, as best seen in FIGS. 5 and 6, a hollow stub shaft or collar 72 is welded to the outside of each boom point section side plate 40 as at 74. Each of a pair of saddle brackets 76,76 is provided with a circular opening therein and is mounted in rotatable relationship to side plate 40 about the axis of one of the hollow stub shafts or collars 72,72. See FIG. 7.

Each saddle block 76 includes a fastening means 78 for "trapping" its rear reaction slide pad 46 in place. This fastening means can be unfastened, and an opening 80 provided in each rear reaction slide pad 46 is useful for pulling the slide pad out when it is worn or for other reason needs to be replaced.

It is to be noted in FIGS. 5 and 6 that the thickness of each of the rear reaction slide pads 46 is such that it will bear and slide between the boom point section side plate 40 and the adjacent boom base section side plate 50 when necessary to resist side loads on the boom.

The arrow 82 in FIG. 7 illustrates that the rear of the boom point section 30 is being forced upwardly by the weight of that section and by the load on the boom. Such forces are transmitted through side plates 40, collars 72, and saddle blocks 76 along the entire length of slide pad 46 to the inner surface of the boom base section cap plate 48 immediately adjacent to the boom base section side plates 50,50.

As the angular relationship of this boom base section cap plate 48 changes with respect to the longitudinal axis of the rear portion of the boom point section 30, saddle block 76 is free to rotate with respect to the side plates 40,40 around the axis of the hollow stub shafts or collars 72,72 to the end that the entire length of rear reaction slide pads 46,46 maintains intimate and equal and even bearing force relationship with respect to the base section cap plate 48.

Once the saddle brackets 76,76 are assembled in pivotal relationship with respect to the collars 72,72, a collar cap ring 84 is welded to each collar as at 86 to "trap" the saddle brackets while allowing them to freely rotate or pivot with respect to boom section side plates 40,40 about the axis of the collar 72.

As illustrated in FIGS. 4 and 7, upper side slide pads 88,88 are bolted as at 90 to boom base section side plate extensions 92,92 and boom base section side plates 50,50 to resist side loading between the upper portions of these adjacent boom sections. Note that a nominal clearance is provided between each upper side slide pad 88 and its adjacent outer surface of boom point section side plate 40.

As seen in FIG. 8, a pair of lower side slide pads 94,94 are bolted as at 96 through the upright front side pad carrier walls 58,58 of the front slide pad carrier 54 to be in position to bear against the outer surface of boom point section side plates 40,40 at the lower portion of the side plates. In order to keep the front slide pads carrier 54 and consequently the lower side slide pads 94,94 in alignment with the forward portion of the boom base section 22, a retainer bar 98 integral with and extending downwardly from the front slide pad carrier floor 56 is positioned in a slot 100 which is provided in the boom base section bottom plate 52 as best seen in FIG. 8. Also best seen in FIG. 8 is a two part carrier support yoke 102 which adds stiffness to the U-shaped carrier 54 to insure that the lower side slide pads 94,94 are effective in maintaining the centered position of the boom point section side plates 40,40 with respect to the carrier 54 even in the presence of side loading on the boom.

All of the slide pads, including front reaction slide pads 38,38, rear reaction slide pads 46,46, upper side slide pads 88,88 and lower side slide pads 94,94, can be made from any one of a number of suitable low friction, wear resistant materials such as nylon base materials sometimes sold under the trademark NYLATRON, sold by Polymer Corporation. As explained above, all can be easily replaced, and the positioning of the side slide pads can also be adjusted to overcome or compensate for wear.

While plain, flat boom section side plates, bottom plates and cap plates have been shown and described, the invention will work also in conjunction with boom sections made of side walls, cap walls and bottom walls of laced or lattice construction. The terms "side panels, bottom panels and cap panels" are used to denote both the side plates, bottom plates and cap plates of plate-type boom sections and also side walls, bottom walls and cap walls of lattice-type boom sections.

The embodiments of the invention in which an exclusive property or privilege is claimed are defined as follows:

1. In a telescopic boom mounted at its inward end on a boom carrier and having at least an outwardly extending inside boom section slidably mounted inside of an inwardly extending outside boom section, said sections each including a pair of spaced apart upright side panels and a bottom panel and a cap panel joining the bottom and top edges of the side panels, respectively, each of the panels of each section lying in spaced relation to the corresponding panel of its adjacent section when the boom is retracted, and power means for telescoping the sections with respect to each other;

a slide pad boom section mounting structure including:

A. a pair of rear reaction slide pads;

B. means entirely between adjacent surfaces of the side panels of said inside boom section and said outside boom section for pivotally supporting one of said rear reaction slide pads on a rear portion of each of said inside boom section side panels to lie in sliding and supported relation to said cap panel of said outside boom section;

C. a pair of front reaction slide pads; and

D. means between side panels and bottom panels of said inside boom section and said outside boom section for pivotally supporting said front reaction slide pads on front portions of said outside boom section side panels adjacent said inside boom section side panels to lie in sliding and supporting relation to the inside boom section bottom panel.

2. The mounting structure of claim 1 wherein the rear reaction slide pads are of a thickness so that they come into sliding relation between said outside and inside side panels to furnish side support to the inside boom section when the boom is subjected to side loads.

3. The mounting structure of claim 2 and means including a pair of lower side slide pads mounted with the front reaction slide pad mounting means to furnish side support to the inside boom section when the boom is subjected to side loads.

4. The mounting structure of claim 3 and a pair of upper side slide pads mounted to an upper portion of the outside boom section between the side panels of the outside boom section and the inside boom section at position adjacent the front reaction slide pad mounting means, said upper slide pads being of dimension to furnish side support to the inside boom section when the boom is subjected to side loads.

5. In a telescopic boom mounted at its inward end on a boom carrier and having at least an outwardly extending inside boom section slidably mounted inside of an inwardly extending outside boom section, said sections each including a pair of spaced apart upright side panels and a bottom panel and a cap panel joining the bottom and top edges of the side panels, respectively, each of the panels of each section lying in spaced relation to the corresponding panel of its adjacent section when the boom is retracted, and power means for telescoping the sections with respect to each other;

a slide pad boom section mounting structure including:

A. a pair of rear reaction slide pads;

B. means entirely between adjacent side surfaces of the side panels of said inside boom section and said outside boom section for pivotally supporting one of said rear reaction slide pads on each of said inside boom section side panels to lie in sliding and supported relation to said cap panel of said outside boom section and in adjacent relation to the side panels of said outside section;

C. a pair of front reaction slide pads; and

D. means between side panels and bottom panels of said inside boom section and said outside boom section for pivotally supporting said front reaction slide pads on said outside boom section side panels adjacent said inside boom section side panels to lie in sliding and supporting relation to the inside boom section bottom panel and at position immediately vertically below said inside boom section side panels.

6. In a telescopic boom mounted at its inward end on a boom carrier and having at least an outwardly extending inside boom section slidably mounted inside of an inwardly extending outside boom section, said sections each including a pair of spaced apart upright side panels and a bottom panel and a cap panel joining the bottom and top edges of the side panels, respectively, each of the panels of each section lying in spaced relation to the corresponding panel of its adjacent section when the boom is retracted, and power means for telescoping the sections with respect to each other;

a slide pad boom section mounting structure including:

A. a front reaction point slide pad mount mounted on an outward end portion of the outside section to be in supporting and sliding relation to the inside section; and B. a rear reaction point slide pad mount mounted on an inward end of the inside section to be in supported and sliding relation to the outside section; the front reaction mount including (1) a U-shape slide pad carrier pivotally mounted with respect to the side panels of the outside section and extending under the bottom panel of the inside section, (2) a pair of front reaction slide pads, and (3) means for fixedly positioning one of the front reaction slide pads on the carrier to be in sliding and supporting relation to said bottom panel of the inside section in vertical alignment with and just below each one of the side panels of that inside section.

7. The mounting structure of claim 6;

the rear mount including:

(1) a pair of saddle brackets, one pivotally mounted with respect to each one of the side panels of the inside section, and (2) a pair of rear reaction slide pads mounted on the saddle brackets to be in sliding and supported relation to the cap panel of the outside section.

8. The mounting structure of claim 7 wherein the rear reaction slide pads are of a thickness so that they come into sliding relation between said outside and said inside side panels to furnish side support to the inside boom section when the boom is subjected to side loads.

9. The mounting structure of claim 8 and means including a pair of lower side slide pads mounted on the front reaction slide pad carrier in position to furnish side support to the inside boom section when the boom is subjected to side loads, and said lower side slide pad mounting means including a boss extending downwardly from said carrier between said front reaction slide pads, there being a slot provided in said bottom panel of said outside boom section to receive said boss and to limit lateral movement thereof with respect to said outside boom section.

10. The mounting structure of claim 9 and a pair of upper side slide pads mounted to upper portions of the outside boom section side panels between the side panels of the outside boom section and the inside boom section at position adjacent the front reaction slide pad mounting means, said upper slide pads being of dimension to furnish side support to the inside boom section when the boom is subjected to side loads.

11. The mounting structure of claim 6 and a pair of upper side slide pads mounted to upper portions of the outside boom section side panels between the side panels of the outside boom section and the inside boom section at position adjacent the front reaction slide pad mounting means, said upper slide pads being of dimension to furnish side support to the inside boom section when the boom is subjected to side loads.

12. In a telescopic boom mounted at its inward end on a boom carrier and having at least an outwardly extending inside boom section slidably mounted inside of an inwardly extending outside boom section, said sections each including a pair of spaced apart upright panels and a bottom panel and a cap panel joining the bottom and top edges of the side panels, respectively, each of the panels of each section lying in spaced relation to the corresponding panel of its adjacent section when the boom is retracted, and power means for telescoping the sections with respect to each other;

a slide pad boom section mounting structure including:

A. a front reaction point slide pad mount mounted on an outward end portion of the outside section to be in supporting and sliding relation to the inside section; and B. a rear reaction point slide pad mount mounted on an inward end of the inside section to be in supported and sliding relation to the outside section; the rear reaction mount including:

(1) a pair of saddle brackets, one pivotally mounted on each of the side panels of the inside section to lie entirely between the side panels of the inside and outside sections, and (2) a pair of rear reaction slide pads each extending upwardly from one of the saddle brackets between adjacent inside and outside section side panels to be in sliding and supported relation to the cap panel of the outside section.

13. The mounting structure of claim 12 wherein the rear reaction slide pads are of a thickness so that they come into sliding relation between said outside and said inside side panels to furnish side support to the inside boom section when the boom is subjected to side loads.

14. The mounting structure of claim 13 and means including a pair of lower side slide pads mounted on the front reaction slide pad carrier in position to furnish side support to the inside boom section when the boom is subjected to side loads, and said lower side slide pad mounting means including a boss extending downwardly from said carrier between said front reaction slide pads, there being a slot provided in said bottom panel of said outside boom section to receive said boss and to limit lateral movement thereof with respect to said outside boom section.

15. In a telescopic boom mounted at its inward end on a boom carrier and having at least an outwardly extending inside boom section slidably mounted inside of an inwardly extending outside boom section, said sections each including a pair of spaced-apart upright side panels and a bottom panel and a cap panel joining the bottom and top edges of the side panels, respectively, each of the panels of each section lying in spaced relation to the corresponding panel of its adjacent section when the boom is retracted, and power means for telescoping the sections with respect to each other;

a slide pad boom section mounting structure including:

A. a pair of rear reaction slide pads;

B. means entirely between adjacent surfaces of the side panels of said inside boom section and said outside boom section for pivotally supporting one of said rear reaction slide pads on a rear portion of each of said inside boom section side panels to lie in sliding and supported relation to said cap panel of said outside boom section;

C. a pair of front reaction slide pads; and

D. means between side panels and bottom panels of said inside boom section and said outside boom section for pivotally supporting said front reaction slide pads with respect to a front portion of said outside boom section side panels to lie in sliding and supporting relation to the inside boom section bottom panel.

16. In a telescopic boom mounted at its inward end on a boom carrier and having at least an outwardly extending inside boom section slidably mounted inside of an inwardly extending outside boom section, said sections each including a pair of spaced-apart upright side panels and a bottom panel and a cap panel joining the bottom and top edges of the side panels, respectively, each of the panels of each section lying in spaced relation to the corresponding panel of its adjacent section when the boom is retracted, and power means for telescoping the sections with respect to each other;

a slide pad boom section mounting structure including:

A. a pair of rear reaction slide pads;

B. means between side panels of said inside boom section and said outside boom section for pivotally supporting said rear reaction slide pads with respect to a rear portion of said inside boom section side panels to lie in sliding and supported relation to said cap panel of said outside boom section;

C. a pair of front reaction slide pads; and

D. means between side panels and bottom panels of said inside boom section and said outside boom section for pivotally supporting said front reaction slide pads on front portions of said outside boom section side panels adjacent said inside boom section side panels to lie in sliding and supporting relation to the inside boom section bottom panel.

* * * * *